United States Patent [19]
Prost et al.

[11] 3,802,894
[45] Apr. 9, 1974

[54] HYDRAULICALLY SETTING REFRACTORY COMPOSITIONS

[75] Inventors: Lucien Prost, La Tour De Millery; Andre Pauillac, Givors, both of France

[73] Assignee: Societe Prost, Paris, France

[22] Filed: Oct. 6, 1970

[21] Appl. No.: 78,564

[30] Foreign Application Priority Data
Oct. 8, 1969   France .............................. 69.34405

[52] U.S. Cl. .................................. 106/64, 106/104
[51] Int. Cl. ............................................ C04b 7/32
[58] Field of Search ................. 106/64, 104, 95, 97

[56] References Cited
UNITED STATES PATENTS

| | | | |
|---|---|---|---|
| 3,181,959 | 5/1965 | Raine et al. | 106/104 |
| 2,419,684 | 4/1947 | Johnson et al. | 106/64 |
| 2,527,500 | 10/1950 | Norton et al. | 106/64 |
| 3,060,043 | 10/1962 | Renkey | 106/64 |
| 3,226,240 | 12/1965 | Crowley | 106/64 |

*Primary Examiner*—James E. Poer

[57] ABSTRACT

The invention provides novel hydraulically setting refractory compositions comprising a small proportion of hydraulic alumina cement, a pulverulent refractory material, a fluidizing and/or deflocculating agent, and a refractory aggregate.

6 Claims, No Drawings

HYDRAULICALLY SETTING REFRACTORY COMPOSITIONS

This invention relates to refractory compositions based on cement and inert aggregates, to the preparation of such compositions and to products obtained from them.

Known dense refractory concretes generally consist of about 12 to 20 percent of hydraulic alumina cement and of 80 to 88 percent of inert refractory aggregate.

Such refractory concretes show advantages which justify the extension of their range of applications, such as: speed of supply, ease and economy of use, and speed of putting into service. Against this, their properties are generally inferior to those of equivalent baked, shaped refractory products of the same alumina content. In particular, their pyroscopic resistance and their settling on exposure to heat are markedly lower, and their porosity before, and above all after, baking is much higher. Furthermore, their mechanical properties become markedly poorer in the range of temperatures between the dehydration temperature of the binder and the temperature at which ceramization starts. Finally, their CaO content and sometimes their $Fe_2O_3$ content, which are much higher, together with their high porosity, very markedly reduce their resistance to thermochemical corrosion.

In practice, their use also shows another disadvantage. In order to make them entirely convenient to use, the worker on the site frequently excessively increases the amount of water used for mixing which results in a worsening of the intrinsic properties of the material.

All these defects diminish the advantages and economy of use of such known refractory concretes and actually exclude their use in a certain number of applications.

It is thus of interest, from an industrial point of view, to have available dense refractory concretes which do not suffer from these various defects and which furthermore have properties similar to the equivalent baked, shaped refractory products.

The compositions according to the invention comprise:

from 5 to 8 parts by weight of at least one hydraulic alumina cement;

from 2.5 to 4 parts by weight of at least one pulverulent refractory material of very high specific surface area and of high water absorbency;

from 0.01 to 0.30 parts by weight of at least one fluidizing and/or deflocculating agent; and from 86 to 92 parts by weight of at least one refractory aggregate.

Such compositions may be made into concrete in conventional manner by mixing with the requisite amount of water for good workability.

The hydraulic alumina cement or cements used are employed at the rate of 5 to 8 parts per 100 parts by weight of the total mixture. This amount of cement is less than the amounts of cement hitherto used to produce refractory concretes. Suitable cements include the following commercial products for example: Fondu Lafarge Secar 162, Secar 250, Supersecar 250, Rollandshutte Standard, Rolandshutte super, Istrabrand, Lumnite and Ciment Alcoa CA 25.

The pulverulent refractory material of very large specific surface area and of high water absorbency may be, for example: clay, kaolin, micronized silica, micronised alumina, micronised magnesia, micronized chromite or micronised forsterite.

Such materials, which are used at the rate of 2.5 to 4 parts per 100 parts by weight of the total mixture, should be in the form of a fine powder of particle size less than 50 microns (that is to say the largest dimension of the particles is less than 50 microns) and preferably less than 1 micron.

The fluidizing and/or deflocculating agent may be, for example: an alkali metal phosphate, alkali metal polyphosphate, alkali metal carbonate, alkali metal carboxylate, alkali metal humate, or an organic material similar to these salts. Dolaflux Kj referred KJ in example 1, hereinafter set forth, contains some of these compounds, to wit, alkali metal phosphate in the form of sodium phosphate, alkali metal carbonate in the form of sodium carbonate, alkali metal humate in the form of sodium humate and alkali metal silicate in the form of sodium silicate. Giebfix Special referred to in Table 2, hereinafter set forth, contains sodium phosphate, sodium carbonate and sodium silicate. Any of these compounds may be used alone excepting for sodium silicate which is in admixture with at least one of the noted compounds.

Such products, which should be active in an aqueous medium of pH at least 11, are used at the rate of 0.01 to 0.30 part per 100 parts by weight of the total mixture.

The refractory aggregate, which is used at the rate of 86 to 92 parts per 100 parts by weight in the total mixture, can be any material or filler used as an aggregate for the manufacture of dense refractory concretes. The following may be quoted as examples: calcined refractory clay, bauxite, cyanite, sillimanite, andalusite, corundum, tabular alumina, silicon carbide, magnesia, chromite and zircon.

These aggregates should be used in the form of particles of which the largest dimension is less than about 30 mm. However, it is preferable to use aggregates of which all particles pass through a sieve of 10 mm. mesh, and which comprise about 25 percent of particles passing through an 0.5 mm. mesh sieve.

After the various ingredients have been mixed, an amount of water sufficient to give a concrete having the desired properties is added to the mixture.

The amount of hydraulic cement used in the new mixtures is less than that employed in previously known dense concretes. Nevertheless, the product obtained is very homogeneous throughout its mass and displays excellent properties before, during and after an increase in temperature. It is believed that the reason for this is as follows, although the utility of the invention does not depend on this explanation. When, in the conventional process for the preparation of refractory concretes, the cement is treated with the mixing water, a sort of gel of very large specific surface area forms. However, the mobility of the particles of this gel is inadequate to ensure that the particles of the aggregate are properly coated and to fill the holes between these aggregate particles. It is hence necessary, in order to ensure that the concrete has adequate plasticity and that there is a good bond between the particles of the aggregate before and after it is subjected to high temperatures, to use amounts of cement greatly in excess of the theoretical minimum amount.

The mixture according to the present invention on the other hand involves the use of a very small amount of cement, by virtue of the simultaneous use of a pulverulent material and a fluidizing and/or deflocculating agent. In effect, the pulverulent material of very high specific surface area, fluidized and/or deflocculated by means of the appropriate agent, becomes dispersed in very fine particles in electrical equilibrium with those of the cement gel and provides a carrier and a guide for the latter, which thus distribute themselves perfectly over all points of the aggregate. For this reason, a very small amount of cement suffices to provide the refractory concrete, obtained according to the invention, with cohesion and excellent mechanical properties. Thus the invention can be regarded as consisting of the use, for the manufacture of a refractory concrete produced from alumina cement and a refractory aggregate, of a combination of an alumina cement, a pulverulent material of very high specific surface area and of high water absorbency and a fluidizing and/or deflocculating agent.

It is necessary additionally to point out an important property of the mixtures according to the invention when they are brought into contact with water. If the amount of mixing water added to the mixture is that necessary to provide good workability (in particular the amount indicated in the Examples given below), the phenomenon of thixotropy manifests itself to a high degree in the said mixture, which shows itself through a very great reduction in the apparent viscosity of the mixture when the latter is subjected to vibrations or simple shocks. This permits the mixture to become very rapidly and perfectly distributed throughout the entire space to be filled and ensures that the mixture has very good cohesion and high rigidity when the vibrations or shocks are stopped.

If now a slight excess of water is added to the mixture, it immediately becomes excessively fluid and thereby unsuitable for use. Thus, by virtue of the latter property, it is practically impossible to make an error in metering the amount of water used.

The new compositions can be supplied to the user either as non-coherent ready-to-use mixtures which can be put into position by casting and vibration, by tamping or by spraying, or as prefabricated bricks or shaped articles.

The new compositions can also contain additives used to modify the setting of cement.

The Examples which follow illustrate the invention.

EXAMPLE 1

A mixture was prepared which contained, in parts by weight:

| | |
|---|---|
| Aggregate containing 40% of alumina, particle size 0 to 5 mm. | : 90 parts |
| Lafarge alumina cement | : 6 parts |
| Clay | : 4 parts |
| Dolaflux K J, of Zschimmer and Schwartz | : 0.12 part. |

This mixture was mixed with 7 parts of water to prepare a concrete. The properties of this concrete are reported in Table 1 below, in which they are compared with the properties of a conventional type of concrete obtained by mixing 80 parts by weight of the same aggregate with 20 parts by weight of the same cement and making up the said mixture with 12 parts by weight of water. They are also compared with the properties of a super-compressed refractory brick obtained from a mixture of 93 parts by weight of the same aggregate and 7 parts by weight of the same clay, by treating the said mixture with 7 parts by weight of water, molding under high specific pressure and subsequently baking at 1400°C.

TABLE 1

| | conventional type of concrete | Moldable refractory material of the invention | Supercompressed refractory brick |
|---|---|---|---|
| Ingredients (in parts by weight) | | | |
| Aggregate, 40% Al$_2$O$_3$ particle size 0 to 5 mm. | 80 | 90 | 93 |
| Lafarge alumina cement | 20 | 6 | |
| Clay | | 4 | 7 |
| Dolaflux K J (Zschimmer and Schwartz) | | 0.12 | |
| Water (additional) | 12 | 7 | 7 |
| Raw Dried Product: | | | |
| Apparent density (g/cm$^3$) | 2.00 | 2.25 | |
| Open porosity, by volume (%) | 23 | 15.2 | |
| Compressive strength when cold (bars) | 350 | 350 | |
| After baking at: | 1250°C | 1350°C | 1400°C |
| Apparent density (g/cm$^3$) | 1.90 | 2.20 | 2.15 |
| Open porosity, by volume (%) | 27 | 14.4 | 20 |
| Compressive strength when cold (bars) | 250 | 850 | 250 |
| Dimensional change (%) | −0.4 | −0.4 | |
| Pyroscopic resistance | 1480°C | 1710° C | 1720°C |
| Temperature for 0.5% settling under a load of 2 kg/cm$^2$ | 1250°C | 1390°C | 1400°C |

| Flexural Strength when hot | Raw dried product | Raw dried product | Baked product |
|---|---|---|---|
| at a temperature of: | | | |
| 20°C     bars | 48 | 65.3 | 54.8 |
| 400°C | 27 | 54.8 | 57.3 |
| 600°C | 28 | 57 | 62.2 |
| 800°C | 29 | 58.6 | 57.3 |
| 1000°C | 26 | 55.5 | 58.4 |
| 1200°C | 18 | 43.5 | 44 |
| 1300°C | 13 | 33.4 | 33.6 |

EXAMPLE 2

Another mixture according to the invention was prepared from bauxite containing 88 percent of alumina. Table 2 shows the properties of the concrete obtained and compares these properties with those of a conventional concrete and of a refractory brick obtained from the same bauxite.

TABLE 2

|  | Conventional type of concrete | Moldable refractory material of the invention | Supercompressed refractory brick |
|---|---|---|---|
| weight) |  |  |  |
| Guyana bauxite, 88% Al$_2$O$_3$, particle size 0 to 5 mm. | 80 | 92 | 93 |
| Secar 250 Lafarge cement | 20 | 5 |  |
| Clay |  | 3 | 7 |
| Giebfix special (Zschimmer and Schwartz) |  | 0.10 |  |
| Water (additional) | 10 | 6 | 6 |
| Raw Dried Product |  |  |  |
| Apparent density (g/cm$^3$) | 2.60 | 2.85 |  |
| Open porosity, by volume (%) | 25 | 18.9 |  |
| Compressive strength when cold (bars) | 400 | 400 |  |
| After baking at: | 1300°C | 1600°C | 1400°C |
| Apparent density (g/cm$^3$) | 2.50 | 2.96 | 2.70 |
| Open porosity, by volume (%) | 27 | 16.9 | 23 |
| Compressive strength when cold (bars) | 450 | 1200 | 500 |
| Dimensional change (%) | −0.3 | −0.52 |  |
| Pyroscopic resistance | 1800°C | 1920°C | 1880°C |
| Temperature for 0.5% settling under a load of 2 kg/cm$^2$ | 1375°C | 1465°C | 1480°C |

| Flexural strength when hot | Raw dried product | Raw dried product | Baked product |
|---|---|---|---|
| at temperatures of: |  |  |  |
| 20°C bars | 45 | 60.2 | 58 |
| 400°C | 30 | 61.5 | 60.5 |
| 600°C | 31 | 67.6 | 65 |
| 800°C | 33 | 73.8 | 74 |
| 1000°C | 35 | 81.5 | 83 |
| 1200°C | 30 | 60.8 | 62 |
| 1300°C | 21 | 50.2 | 51 |

The data given in Table 3 below show the effect of omitting one of the essential ingredients of the refractory concrete of Example 1.

TABLE 3

|  | Conforming to the invention | not conforming to the invention | not conforming to the invention |
|---|---|---|---|
| Ingredients (in parts by weight) |  |  |  |
| Aggregate, 40% Al$_2$O$_3$, particle size 0 to 5 mm. | 90 | 90 | 94 |
| Lafarge alumina cement | 6 | 6 | 6 |
| Clay | 4 | 4 |  |
| Dolaflux K J (Zschimmer and Schwartz) | 0.12 |  | 0.15 |
| Water (additional) | 7 | 10 | 7 |
| Raw Dried Product: |  |  |  |
| Apparent density (g/cm$^3$) | 2.25 | 2.09 | 2.12 |
| Open porosity, by volume (%) | 15.2 | 22.6 | 21 |
| Compressive strength when cold (bars) | 350 | 100 | 100 |
| After baking at 1350°C |  |  |  |
| Apparent density (g/cm$^3$) | 2.20 | 2.00 | 2.04 |
| Open porosity, by volume (%) | 14.4 | 24.6 | 24 |
| Compressive strength when cold (bars) | 850 | 240 | 150 |
| Dimensional change (%) | −0.04 | +0.43 | +0.67 |

We claim:

1. A refractory composition adapted to be set by addition thereto of water to form a dense refractory concrete comprising 5 to 8 parts by weight of at least one hydraulic alumina cement; 2.5 to 4 parts by weight of at least one pulverulent refractory material selected from the group consisting of clay, kaolin, micronized silica, micronized alumina, micronized magnesia, micronized chromite and micronized forsterite; 0.01 to 0.30 parts by weight of at least one dispersing agent active in an aqueous medium having a pH of at least 11 selected from the group consisting of alkali metal phosphate, alkali metal carbonate and alkali metal humate and mixtures of at least one of said agents with alkali metal silicate, and 86 to 92 parts by weight of at least one refractory aggregate.

2. A refractory composition according to claim 1, in which the said pulverulent material is in the form of a powder of particle size less than 50 microns.

3. A refractory composition according to claim 2, in which the said particle size is less than 1 micron.

4. A refractory composition according to claim 1, in which the refractory aggregate is in the form of particles of which the largest dimension is less than 30 mm.

5. A refractory composition according to claim 4 in which the said particles pass through a 10 mm mesh sieve, and about 25% pass through an 0.5 mm mesh sieve.

6. Process for preparing a refractory concrete comprising mixing 5 to 8 parts by weight of at least one hydraulic alumina cement; 2.5 to 4 parts by weight of at least one pulverulent refractory material selected from the group consisting of clay, kaolin, micronized silica, micronized alumina, micronized magnesia, micronized chromite and micronized forsterite; 0.01 to 0.30 parts by weight of at least one dispersing agent active in an aqueous medium having a pH of at least 11 selected from the group consisting of alkali metal phosphate, alkali metal carbonate and alkali metal humate and mixtures of at least one of said agents with alkali metal silicate, and 86 to 92 parts by weight of at least one refractory aggregate, and adding sufficient water to said mixture to insure workup thereof and allowing the resultant mixture to set.

* * * * *